US012532124B2

(12) United States Patent
Zhang et al.

(10) Patent No.: US 12,532,124 B2
(45) Date of Patent: Jan. 20, 2026

(54) LOUDSPEAKER

(71) Applicant: MERRY ELECTRONICS (SUZHOU) CO., LTD., Suzhou (CN)

(72) Inventors: Yuanyuan Zhang, Suzhou (CN); Mingya Luo, Suzhou (CN); Jian Luo, Suzhou (CN); Xue Li, Suzhou (CN); Xiaoxiang Wei, Suzhou (CN)

(73) Assignee: MERRY ELECTRONICS (SUZHOU) CO., LTD., Suzhou (CN)

( * ) Notice: Subject to any disclaimer, the term of this patent is extended or adjusted under 35 U.S.C. 154(b) by 198 days.

(21) Appl. No.: 18/594,332

(22) Filed: Mar. 4, 2024

(65) Prior Publication Data

US 2024/0348982 A1 Oct. 17, 2024

(30) Foreign Application Priority Data

Apr. 14, 2023 (CN) ......................... 202320830149.7

(51) Int. Cl.

*H04R 9/02* (2006.01)
*H04R 1/02* (2006.01)
*H04R 9/06* (2006.01)

(52) U.S. Cl.

CPC ............. *H04R 9/025* (2013.01); *H04R 1/025* (2013.01); *H04R 9/06* (2013.01); *H04R 2400/11* (2013.01)

(58) Field of Classification Search

CPC .......... H04R 2209/00; H04R 2209/026; H04R 2209/027; H04R 1/2869; H04R 2400/03; H04R 2400/07; H04R 7/02; H04R 9/025; H04R 1/02; H04R 7/20; H04R 9/06; H04R 9/02; H04R 7/122; H04R 2307/201; H04R 2400/11; H04R 2499/111; H04R 1/2892; H04R 1/289; H04R 1/2884; H04R 1/2888; H04R 1/2873

USPC .................................................. 381/400–420

See application file for complete search history.

(56) References Cited

U.S. PATENT DOCUMENTS

| | | | | |
|---|---|---|---|---|
| 10,835,923 B2 * | 11/2020 | Xu | H02K 33/02 | |
| 11,632,609 B1 * | 4/2023 | Lee | H04R 1/2819 | 381/332 |
| 2002/0051557 A1 * | 5/2002 | Kobayashi | H04R 9/06 | 381/401 |
| 2022/0322013 A1 * | 10/2022 | Lv | H04R 9/046 | |
| 2024/0348985 A1 * | 10/2024 | Zhang | H04R 9/066 | |

FOREIGN PATENT DOCUMENTS

| | | |
|---|---|---|
| CN | 204733358 U | 10/2015 |
| CN | 212115579 U | 12/2020 |

* cited by examiner

*Primary Examiner* — Carolyn R Edwards
*Assistant Examiner* — Julie X Dang
(74) *Attorney, Agent, or Firm* — Birch, Stewart, Kolasch & Birch, LLP

(57) ABSTRACT

A loudspeaker includes a main shell body, as well as an elastic body, an inner support body and a sound generating unit which are connected in sequence from an exterior of the main shell body inwards. The sound generating unit includes a yoke suspended in an inner cavity of the main shell body, the inner support body includes a support rod body, a first connection portion is formed on a side of the support rod body facing the yoke and is connected to the yoke, a second connection portion is formed on another side of the inner support body facing the elastic body and is connected to the elastic body.

20 Claims, 5 Drawing Sheets

LOUDSPEAKER

CROSS-REFERENCE TO RELATED APPLICATIONS

This application claims priority to Chinese Patent Application 202320830149.7 filed Apr. 14, 2023, the disclosure of which is incorporated herein by reference in its entirety.

TECHNICAL FIELD

The present disclosure relates to the technical field of loudspeakers, and in particular to, a loudspeaker.

BACKGROUND

An inner space of a vibration structure on a loudspeaker serves as a rear cavity, and a voice coil, a magnetic pole piece, a magnet and a yoke are arranged in the rear cavity. The voice coil is connected to the vibration structure, the magnetic pole piece, the magnet and the yoke form a magnetic circuit structure, and the magnetic circuit structure is connected to a shell supporting the vibration structure. When alternating current is connected, the voice coil drives the vibration structure to vibrate and sound under the action of an ampere force. At this time, the magnetic circuit structure formed by the magnetic pole piece, the magnet and the yoke is subjected to a reverse acting force, and the reverse acting force is equal in magnitude and opposite in direction to the ampere fore experienced by the voice coil. The reverse acting force is ultimately transmitted to the shell of the loudspeaker, thereby causing the excessive vibration of the shell, causing the damage to the sound quality, and thus affecting the consumer's experience of use.

In order to solve the above-described problems, the yoke in the magnetic circuit structure may be suspended, and the yoke is connected to an inner wall of the shell through an elastic material. In this loudspeaker structure, the elastic material is provided so that the reverse acting force is avoided from being directly transmitted to the shell so as to play a role of damping vibration. However, the rigidity of the elastic material is poor, so that the strength of connection between the yoke and the elastic material is reduced, thereby affecting the reliability of connection between the yoke and the elastic material and the service life of the loudspeaker.

SUMMARY

The present disclosure provides a loudspeaker, which can improve the installation reliability of a yoke and prolong the service life of the loudspeaker.

For this purpose, the present disclosure adopts the following technical schemes.

The present disclosure provides a loudspeaker. The loudspeaker includes a main shell body, as well as an elastic body, an inner support body, and a sound generating unit. The elastic body, the inner support body and the sound generating unit are connected in sequence from an exterior of the main shell body inwards. The sound generating unit includes a yoke, and the yoke is suspended in an inner cavity of the main shell body. The inner support body includes a support rod body, a first connection portion is formed on a side of the support rod body facing the yoke, the first connection portion is connected to the yoke, a second connection portion is formed on another side of the inner support body facing the elastic body, and the second connection portion is connected to the elastic body.

In an embodiment, the first connection portion includes a planar portion and a ramp portion, the planar portion is connected to the yoke, the ramp portion is connected to the planar portion and is away from the yoke, and the ramp portion is configured to be spaced apart from the yoke.

In an embodiment, the yoke includes a bottom plate and a convex portion extending upwardly along an outer circumference of the bottom plate, the planar portion forms a first step groove mated with the convex portion, and at least part of the convex portion is arranged in the first step groove.

In an embodiment, a boss is arranged on a side of the elastic body facing the inner support body, the second connection portion is formed with a second step groove mated with the boss, and the boss is arranged in the second step groove.

In an embodiment, the inner support body is formed as an integral frame-shaped structure that conforms to the main shell body.

In an embodiment, multiple inner support bodies are provided, and the multiple inner support bodies are disposed around a peripheral direction of the main shell body.

In an embodiment, each of the multiple inner support bodies further includes two first limiting portions, the two first limiting portions are arranged at two ends of the first connection portion, respectively, the two first limiting portions extend towards a direction of the sound generating unit, the two first limiting portions and the first connection portion are arranged to define a first receiving cavity, and at least part of the yoke is arranged within the first receiving cavity.

In an embodiment, each of the multiple inner support bodies further includes two second limiting portions, the two second limiting portions are arranged at two ends of the second connection portion, respectively, the two second limiting portions extend towards a direction away from the two first limiting portion, the two second limiting portions and the second connection portion are arranged to define a second receiving cavity, and at least part of the elastic body is arranged within the second receiving cavity.

In an embodiment, a notch is formed on a side of the elastic body facing the second connection portion, the notch is mated with an outer wall of each of the two second limiting portions, and the notch fits at least part of the outer wall of the each of the two second limiting portions.

In an embodiment, a wedge-shaped surface is formed on a side of the two second limiting portions facing the elastic body, and the wedge-shaped surface extends in a direction towards the bottom plate of the yoke and is away from the elastic body.

REFERENCE LIST

Figure 1:
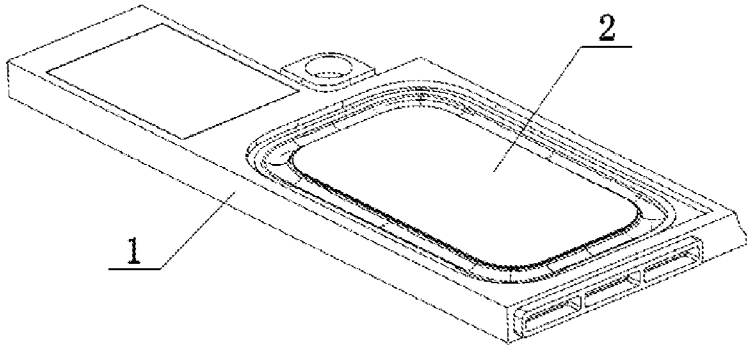
FIG. 1 is a structure view of a loudspeaker according to an embodiment of the present disclosure.

1 shell
11 main shell body
12 inner support body
121 support rod body
1211 first connection portion
1211*a* planar portion
1211*b* ramp portion
1211*c* first step groove
1212 second connection portion
1212*a* second step groove
122 first limiting portion
123 first receiving cavity
124 second limiting portion
125 second receiving cavity
13 elastic body
131 boss
132 notch
133 extension convex hull
2 vibration structure
3 sound generating unit
31 yoke
311 bottom plate
312 convex portion
4 voice coil

DETAILED DESCRIPTION

Embodiments of the present disclosure will be described in detail below, examples of the described embodiments are shown in the accompanying drawings, where same or similar reference numerals refer to same or similar parts or parts having same or similar functions throughout. The embodiments described below with reference to the accompanying drawings are exemplary, are intended to explain the present disclosure, and are not be construed as limiting the present disclosure.

In the description of the present disclosure, unless otherwise expressly specified and limited, the term "connected to each other", "connected", or "fixed" is to be construed in a broad sense, for example, as securely connected, or detachably connected; mechanically connected or electrically connected; directly connected to each other, indirectly connected to each other via an intermediary, internal connection between two elements, or interaction between two elements. For those of ordinary skill in the art, specific meanings of the preceding terms in the present disclosure may be understood based on specific situations.

In the description of the present disclosure, unless otherwise expressly specified and limited, a first feature being "on" or "under" a second feature may include the first feature and the second feature being in direct contact, or may include the first feature and the second feature not being in direct contact but being in contact with each other through an additional feature therebetween. Moreover, the first feature being "on", "above" or "over" the second feature includes the first feature being directly on, above or over and obliquely on, above or over the second feature, or simply indicates that the first feature is at a higher level than the second feature. The first feature being "under", "below" or "underneath" the second feature includes the first feature being directly under, below or underneath and obliquely under, below or underneath the second feature, or simply represents that the first feature is at a lower level than the second feature.

The technical schemes of the present disclosure are further explained hereinafter in conjunction with drawings and the specific implementation mode.

As shown in FIGS. 1 to 13, the present disclosure provides a loudspeaker. The loudspeaker includes a main shell body 11, an elastic body 13, an inner support body 12 and a sound generating unit 3, where the elastic body 13, the inner support body 12 and the sound generating unit 3 are connected in sequence from an exterior of the main shell body 11 inwards. The sound generating unit 3 includes a yoke 31, and the yoke 3 is suspended in an inner cavity of the main shell body 11. The inner support body 12 includes a support rod body 121, a first connection portion 1211 is formed on a side (corresponding to the left side of FIG. 5) of the support rod body 121 facing the yoke 31 and is connected to the yoke 31, and a second connection portion 1212 is formed on another side (corresponding to the right side of FIG. 5) of the inner support body 12 facing the elastic body 13 and is connected to the elastic body 13.

According to the present disclosure, the inner support body 12 is arranged between the yoke 31 and the elastic body 13, the first connection portion 1211 in the support rod body 121 of the inner support body 12 is connected to the yoke 31, and the second connection portion 1212 in the support rod body 121 is connected to the elastic body 13, so that the yoke 31 is connected to the main shell body 11 sequentially through the first connection portion 1211 of the inner support body 12, the second connection portion 1212 of the inner support body 12, and the elastic body 13, thereby achieving the vibration reduction of the loudspeaker, improving the installation reliability of the yoke 31, and prolonging the service life of the loudspeaker.

In the present disclosure, the first connection portion 1211 includes a planar portion 1211*a* and a ramp portion 1211*b*, the planar portion 1211*a* is connected to the yoke 31, the ramp portion 1211*b* is connected to the planar portion 1211*a* and is away from the yoke 31, and the ramp portion 1211*b* is configured to be spaced apart from the yoke 31. That is, as shown in FIGS. 3, 5, 6, 7 and 10, the first connection portion 1211 is formed in a wedge-shaped structure with a wide upper portion and a narrow lower portion, an upper portion (corresponding to an upper portion of FIG. 5) of the first connection portion 1211 is the planar portion 1211*a*, and the planar portion 1211*a* is connected to the yoke 31. The inner support body 12 may be made of, for example, the same material as that of the main shell body 11 and has a hardness greater than that of the elastic body 13, so that the reliability of connection between the inner support body 12 and the yoke 31 can be improved, the yoke 31 is prevented from being disengaged from the shell structure when the sound generating device drops, and the service life of the sound generating device is prolonged. A lower portion (corresponding to a lower portion of FIG. 5) of the first connection portion 1211 is a ramp portion 1211*b*, and the ramp portion 1211*b* is configured to be spaced apart from the yoke 31, that is, be not in contact with the yoke 31, so that the contact area between the yoke 31 and the inner support body 12 is minimized on the premise that the strength of connection between the yoke 31 and the first connection portion 1211 is ensured, thereby preventing the reaction force of the yoke 31 from being transmitted to the main shell body 11, and further improving the vibration damping performance of the loudspeaker.

Figure 6:
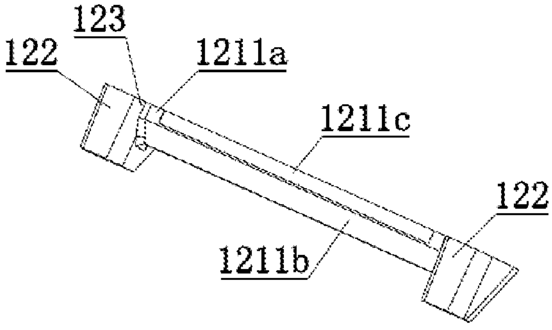
FIG. 6 is a structure view of an inner support body facing a sound generating unit according to an embodiment of the present disclosure.
Figure 7:
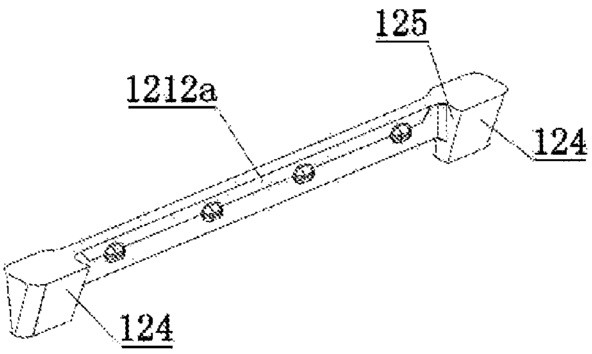
FIG. 7 is a structure view of an inner support body facing a first elastic body according to an embodiment of the present disclosure.
Figure 8:
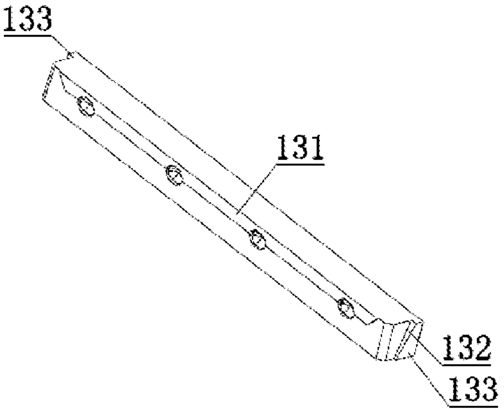
FIG. 8 is a structure view of an elastic body according to an embodiment of the present disclosure.
Figure 9:
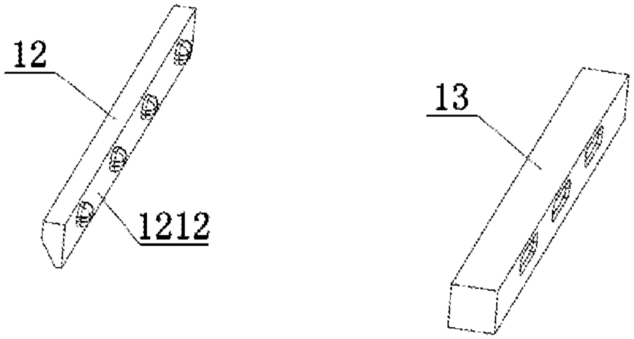
FIG. 9 is an exploded view of another inner support body and a second elastic body cooperating with each other according to an embodiment of the present disclosure.
Figure 10:
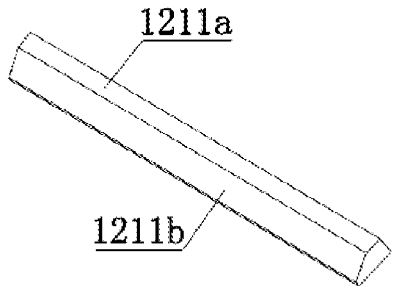
FIG. 10 is a structure view of another inner support body facing the sound generating unit according to an embodiment of the present disclosure.
Figure 11:
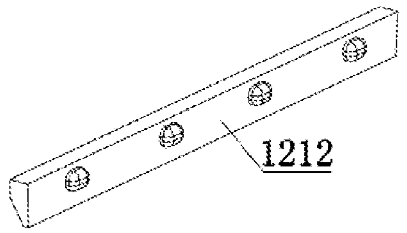
FIG. 11 is a structure view of another inner support body facing an elastic body according to an embodiment of the present disclosure.
Figure 12:
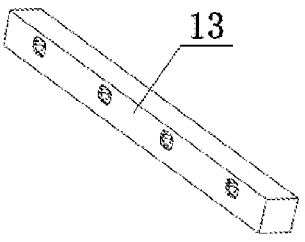
FIG. 12 is a structure view of another elastic body according to an embodiment of the present disclosure.

In the present disclosure, the yoke 31 includes a bottom plate 311 and a convex portion 312 extending upwardly along an outer circumference of the bottom plate 311, the planar portion 1211*a* forms a first step groove 1211*c* mated with the convex portion 312, and at least part of the convex portion 312 is arranged in the first step groove 1211*c*. That is, the first step groove 1211*c* is arranged at a position of the planar portion 1211*a* of the first connection portion 1211. As shown in FIGS. 6, 7 and 8, the first step groove 1211*c* is provided so that the reliability of connection between the yoke 31 and the inner support body 12 can be further improved.

Optionally, a cutting depth of the first step groove 1211*c* may be, for example, equal to a thickness of the convex portion 312, that is, the convex portion 312 is completely arranged in the first step groove 1211*c*. With this arrangement, the strength of connection between the yoke 31 and the inner support body 12 can be further improved. However, a larger depth of the first step groove 1211*c* requires the inner support body 12 to have a larger thickness, and moreover, also makes the loudspeaker become larger. In an embodiment, as shown in FIG. 6, the cutting depth of the first step groove 1211*c* may be, for example, less than the thickness of the convex portion 312, that is, the convex portion 312 is partially arranged in the first step groove 1211*c*. With this arrangement, the strength of connection between the first connection portion 1211 and the yoke 31 can be improved without increasing the thickness of the inner support body 12, and the cost can be saved.

It should be noted that, as shown in FIGS. 7, 8, 9, 11 and 12, for example, a first convex head may be arranged on the first connection portion 1211 to improve the strength of connection between the yoke 31 and the inner support body 12. For example, a surface of the upper portion of the first connection portion 1211 may be treated to form a rough surface so as to improve the static friction between the first connection portion 1211 and the yoke 31.

In the present disclosure, a boss 131 is arranged on a side of the elastic body 13 facing the inner support body 12, the second connection portion 1212 is formed with a second step groove 1212*a* mated with the boss 131, and the boss 131 is arranged in the second step groove 1212*a*. That is, as shown in FIGS. 7 and 8, the boss 131 of the elastic body 13 is mated with the second step groove 1212*a* on the second connection portion 1212, so that the strength of connection between the elastic body 13 and the inner support body 12 can be improved. It should be noted that the side of the elastic body 13 facing the inner support body 12 may also be provided as a groove body structure, and the second connection portion 1212 may correspondingly be provided as a convex structure mated with the groove body structure, so that the elastic body 13 and the inner support body 12 are connected by a concave structure and a convex structure, thereby further improving the strength of connection between the elastic body 13 and the inner support body 12.

Correspondingly, as shown in FIGS. 5, 8, 9 and 13, a concave structure and a convex structure mated with each other may be arranged on a side of the elastic body 13 facing the main shell body 11 and on an inner wall of the main shell body 11, so as to further improve the strength of connection between the elastic body 13 and the main shell body 11.

As an implementation mode of the present disclosure, the inner support body 12 is formed as an integral frame-shaped structure (not shown) that adapts to the main shell body 11. That is, after the inner support body 12 and the main shell body 11 are integrally formed by injection molding, only the plastic connecting the inner support body 12 and the main shell body 11 needs to be cut off, and then assembling and combining are performed, which has the advantage of convenient assembly.

Figure 3:
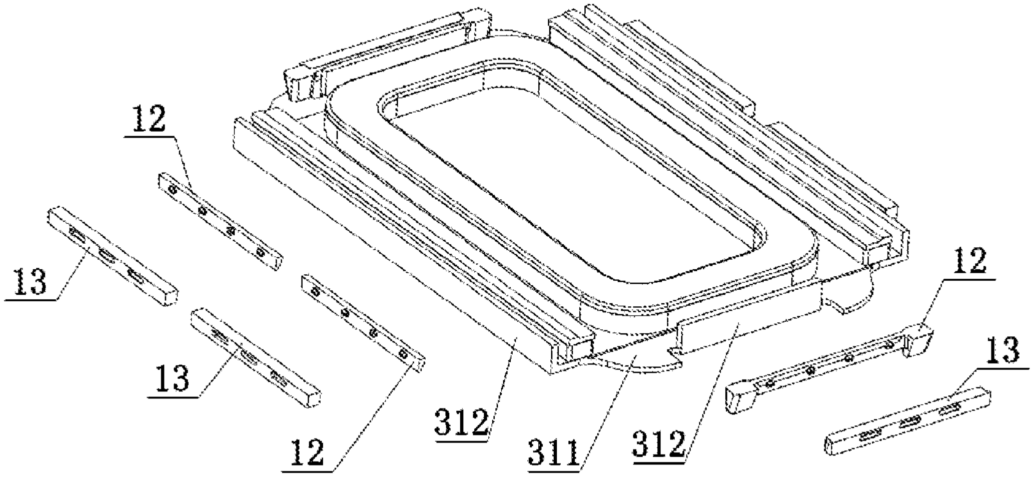
FIG. 3 is an exploded view of a sound generating unit, an inner support body and an elastic body of a loudspeaker cooperating with each other according to an embodiment of the present disclosure.

As another implementation mode of the present disclosure, multiple inner support bodies 12 are provided, and the multiple inner support bodies 12 are disposed around a peripheral direction of the main shell body 11. That is, as shown in FIG. 3, after the inner support body 12 and the main shell body 11 are integrally formed by injection molding, the plastic connecting the inner support body 12 and the main shell body 11 needs to be cut off firstly, then the inner support body 12 is cut into multiple sections, the excess material pieces are removed, and finally the assembling is performed. The multiple inner support bodies 12 are provided so that the utilization rate of the inner cavity space of the main shell body 11 can be improved, and the volume of the loudspeaker can be reduced.

Figure 4:
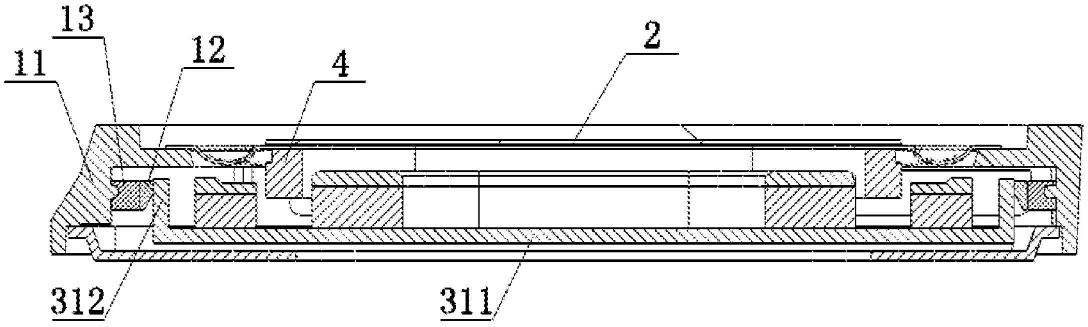
FIG. 4 is a sectional view of a loudspeaker according to an embodiment of the present disclosure.
Figure 13:
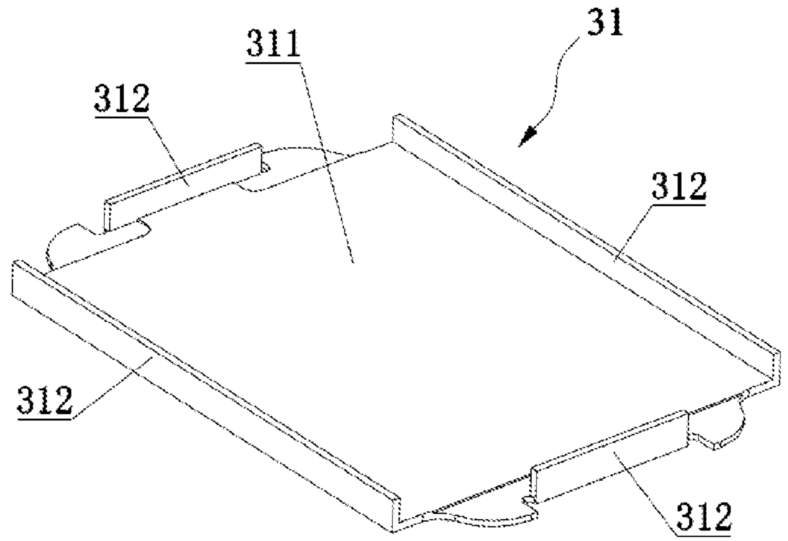
FIG. 13 is a structure view of a yoke according to an embodiment of the present disclosure.

Specifically, the inner support body 12 further includes two first limiting portions 122, the two first limiting portions 122 are arranged at two ends of the first connection portion 1211, respectively, the two first limiting portions 122 extend towards a direction of the sound generating unit 3, and the two first limiting portions 122 and the first connection portion 1211 are arranged to define a first receiving cavity 123, and at least part of the yoke 31 is arranged within the first receiving cavity 123. That is, as shown in FIGS. 4, 6 and 13, the two first limiting portions 122 are formed at two ends of the first connection portion 1211 of the support rod body 121, respectively, and the two first limiting portions 122 and the first connection portion 1211 are arranged to define the first receiving cavity 123 configured to receive the yoke 31. An inner wall of the first receiving cavity 123 may be adhesively connected to an end of the yoke 31 or to an outer peripheral wall of the convex portion 312 in the yoke 31, thereby further improving the strength of connection between the yoke 31 and the inner support bodies 12.

More specifically, the inner support body 12 further includes two second limiting portions 124, the two second limiting portions 124 are arranged at two ends of the second connection portion 1212, respectively, the two second limiting portions 124 extend towards a direction away from the first limiting portion 122, the two second limiting portions 124 and the second connection portion 1212 are arranged to define a second receiving cavity 125, and at least part of the elastic body 13 is arranged within the second receiving cavity 125. That is, as shown in FIGS. 3, 6 and 7, two second limiting portions 124 are formed at two ends of the second connection portion 1212 of the support rod body 121, respectively, and the two second limiting portions 124 and the second connection portion 1212 are arranged to define the second receiving cavity 125 configured to receive the elastic body 13. An end of the elastic body 31 may be adhesively connected to an outer peripheral wall of the second receiving cavity 125, thereby further improving the strength of connection between the yoke 31 and the inner support bodies 12.

More specifically, a notch 132 is formed on a side of the elastic body 13 facing the second connection portion 1212, the notch 132 is mated with an outer wall of the second limiting portion 124, and the notch 132 fits the outer wall of the second limiting portion 124. That is, as shown in FIGS. 2, 5, 7 and 8, part of the elastic body 13 is arranged within the second receiving cavity 125, and the other part of the elastic body 13 extends beyond the second receiving cavity 125. The other part of the elastic body 13 is two extension convex hulls 133 located on a side of the elastic body 13 facing away from the inner support body 12, and the two extension convex hulls 133 and part of the elastic body 13 arranged within the second receiving cavity 125 form two notches 132, the two notches 132 are mated with outer walls of the two second limiting portions 124, respectively, thereby further improving the strength of connection between the elastic body 13 and the inner support bodies 12.

Figure 2:
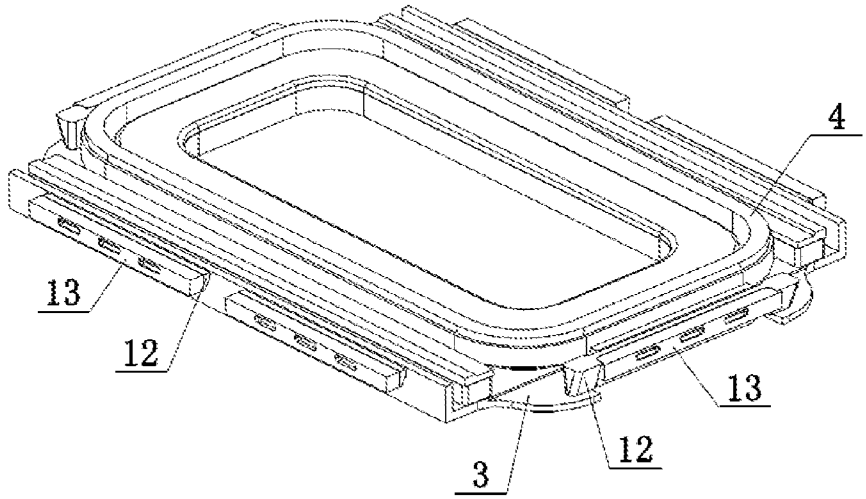
FIG. 2 is a structure view showing a partial structure of a loudspeaker according to an embodiment of the present disclosure.
Figure 5:
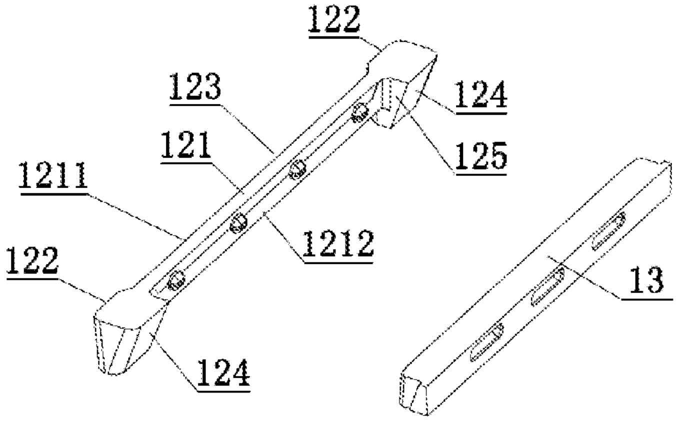
FIG. 5 is an exploded view of an inner support body and a first elastic body cooperating with each other according to an embodiment of the present disclosure.

More specifically, a wedge-shaped surface is formed on a side of the second limiting portion 124 facing the elastic body 13, and the wedge-shaped surface extends in a direction towards the bottom plate 311 of the yoke 31 and is away from the elastic body 13. As shown in FIGS. 5 and 7, that is, the wedge-shaped surface is formed in a ramp structure having a wide upper portion and a narrow lower portion in consideration of the elastic body 13 being formed by an injection molding process. Specifically, the method for molding the shell of the loudspeaker of the present disclosure is as follows: firstly, the main shell body 11 and the inner support bodies 12 may be integrally formed by injection molding, then the elastic body 13 is injection molded between gaps between the main shell body 11 and the inner support bodies 12, since the wedge-shaped surface with a wide upper surface and a narrow lower surface is formed on the side of the second limiting portion 124 of the inner support bodies 12 facing the elastic body 13, thereby facilitating the encapsulation at the time of injection molding, and moreover, preventing the silicone glue from being overflowed, and improving the fluidity of the silicone glue. It should be noted that as shown in FIG. 2, after the elastic body 13 is injection molded, the elastic body 13 may also be cut into multiple sections corresponding to the inner support bodies 12, the excess material pieces are removed, and finally the elastic body 13 is assembled with the inner support bodies 12.

The loudspeaker of the present disclosure includes a shell 1, a vibration structure 2, a sound generating unit 3, and a voice coil 4 as a whole. The shell 1 includes a main shell body 11, an inner support body 12 and an elastic body 13. The inner support body 12 is connected to the main shell body 11 through the elastic body 13. The vibration structure 2, the sound generating unit 3 and the voice coil 4 are all arranged in the main shell body 11. The specific structure and connection method thereof refer to those of the related art, and will not be described in detail herein.

Apparently, the above-described embodiments of the present disclosure are merely examples for clearly illustrating the present disclosure and are not intended to limit the implementation modes of the present disclosure. Other variations or modifications in different forms may be made in light of the above description for those of ordinary skill in the art. This need not be, nor should it be exhaustive of all implementation modes.

What is claimed is:

1. A loudspeaker, comprising:

a main shell body, and an elastic body, an inner support body, and a sound generating unit connected in sequence from an exterior of the main shell body inwards;

wherein the sound generating unit comprises a yoke, and the yoke is suspended in an inner cavity of the main shell body; and wherein the inner support body comprises a support rod body, a first connection portion is formed on a side of the support rod body facing the yoke, the first connection portion is connected to the yoke, a second connection portion is formed on another side of the inner support body facing the elastic body, and the second connection portion is connected to the elastic body.

2. The loudspeaker of claim 1, wherein the first connection portion is formed in a wedge-shaped structure with a wide upper part and a narrow lower part.

3. The loudspeaker of claim 2, wherein the first connection portion comprises a planar portion and a ramp portion, the planar portion is connected to the yoke, the ramp portion is connected to the planar portion and is away from the yoke, and the ramp portion is configured to be spaced apart from the yoke.

4. The loudspeaker of claim 2, wherein the yoke comprises a bottom plate and a convex portion extending upwardly along an outer circumference of the bottom plate, the planar portion forms a first step groove mated with the convex portion, and at least part of the convex portion is arranged in the first step groove.

5. The loudspeaker of claim 4, wherein a cutting depth of the first step groove is equal to a thickness of the convex portion.

6. The loudspeaker of claim 4, wherein a cutting depth of the first step groove is less than a thickness of the convex portion.

7. The loudspeaker of claim 1, wherein a boss is arranged on a side of the elastic body facing the inner support body, the second connection portion is formed with a second step groove mated with the boss, and the boss is arranged in the second step groove.

8. The loudspeaker of claim 7, wherein the side of the elastic body facing the inner support body is configured as a groove body structure, the second connection portion is configured as a convex structure mated with the groove body structure, and the elastic body and the inner support body are connected through the groove body structure and the convex structure.

9. The loudspeaker of claim 1, wherein the inner support body is formed as an integral frame-shaped structure that conforms to the main shell body.

10. The loudspeaker of claim 1, wherein a plurality of inner support bodies are provided, and the plurality of inner support bodies are disposed around a peripheral direction of the main shell body.

11. The loudspeaker of claim 10, wherein the elastic body comprises a plurality of sections in one-to-one correspondence with the plurality of inner support bodies.

12. The loudspeaker of claim 10, wherein each of the plurality of inner support bodies further comprises two first limiting portions, the two first limiting portions are arranged at two ends of the first connection portion, respectively, the two first limiting portions extend towards a direction of the sound generating unit, the two first limiting portions and the first connection portion are arranged to define a first receiving cavity, and at least part of the yoke is arranged within the first receiving cavity.

13. The loudspeaker of claim 12, wherein each of the plurality of inner support bodies further comprises two second limiting portions, the two second limiting portions are arranged at two ends of the second connection portion, respectively, the two second limiting portions extend towards a direction away from the two first limiting portion, the two second limiting portions and the second connection portion are arranged to define a second receiving cavity, and at least part of the elastic body is arranged within the second receiving cavity.

14. The loudspeaker of claim 13, wherein a notch is formed on a side of the elastic body facing the second connection portion, the notch is mated with an outer wall of each of the two second limiting portions, and the notch fits at least part of the outer wall of the each of the two second limiting portions.

15. The loudspeaker of claim 14, wherein a wedge-shaped surface is formed on a side of the two second limiting portions facing the elastic body, and the wedge-shaped surface extends in a direction towards the bottom plate of the yoke and is away from the elastic body.

16. The loudspeaker of claim 1, wherein the inner support body is made of a material that is identical to a material of the main shell body, and the inner support body has a hardness greater than a hardness of the elastic body.

17. The loudspeaker of claim 1, wherein a first convex head is arranged on the first connection portion.

18. The loudspeaker of claim 1, wherein a surface of the upper portion of the first connection portion is a rough surface.

19. The loudspeaker of claim 1, wherein a side of the elastic body facing the main shell body is connected to an inner wall of the main shell body through a concave structure and a convex structure.

20. The loudspeaker of claim 1, further comprising:

a shell, comprising the main shell body, the inner support body and the elastic body, wherein the inner support body is connected to the main shell body through the elastic body; and a vibration structure, wherein the vibration structure and the sound generating unit are disposed in the main shell body.

* * * * *